(12) United States Patent
Baer et al.

(10) Patent No.: US 10,612,905 B2
(45) Date of Patent: Apr. 7, 2020

(54) INTERFEROMETER USING TILTED OBJECT WAVES AND COMPRISING A FIZEAU INTERFEROMETER OBJECTIVE

(71) Applicant: UNIVERSITAET STUTTGART, Stuttgart (DE)

(72) Inventors: Goran Baer, Berlin (DE); Christof Pruss, Ostfildern (DE); Wolfgang Osten, Stuttgart (DE)

(73) Assignee: UNIVERSITAET STUTTGART, Stuttgart (DE)

( * ) Notice: Subject to any disclaimer, the term of this patent is extended or adjusted under 35 U.S.C. 154(b) by 0 days.

(21) Appl. No.: 15/775,973

(22) PCT Filed: Nov. 14, 2016

(86) PCT No.: PCT/EP2016/077610
§ 371 (c)(1),
(2) Date: May 14, 2018

(87) PCT Pub. No.: WO2017/081328
PCT Pub. Date: May 18, 2017

(65) Prior Publication Data
US 2018/0328711 A1    Nov. 15, 2018

(30) Foreign Application Priority Data

Nov. 12, 2015  (DE) .................. 10 2015 222 366

(51) Int. Cl.
| | | |
|---|---|---|
| *G01B 9/02* | (2006.01) | |
| *G01M 11/00* | (2006.01) | |
| *G01M 11/02* | (2006.01) | |

(52) U.S. Cl.
CPC ..... *G01B 9/02027* (2013.01); *G01B 9/02007* (2013.01); *G01B 9/02032* (2013.01);
(Continued)

(58) Field of Classification Search
None
See application file for complete search history.

(56) References Cited

U.S. PATENT DOCUMENTS 5,561,525 A * 10/1996 Toyonaga .......... G01B 11/2441
                                                      356/512
2004/0141184 A1   7/2004 Ueki
(Continued)

FOREIGN PATENT DOCUMENTS

| CN | 102589414 A | 7/2012 |
|---|---|---|
| CN | 102607454 A | 7/2012 |

(Continued)

OTHER PUBLICATIONS

W. Osten, et al: "Testing Aspheric Lenses: New Approaches", XP055337077. Optoelectronics, Instrumentation and Data Processing, 2010, vol. 46, No. 4, pp. 329-339. Allerton Press, Inc., 2010.
(Continued)

*Primary Examiner* — Shawn Decenzo
(74) *Attorney, Agent, or Firm* — Bond Schoeneck & King, PLLC; George McGuire (57) ABSTRACT

An interferometer for areally measuring an optically smooth surface is presented, including means for illuminating a surface region with a plurality of discrete object waves from different directions and comprising means which, on a detector, superimpose object waves reflected at the surface onto a reference wave that is coherent with a plurality of object waves in order to form an interferogram. The interferometer is distinguished by virtue of it being configured to illuminate the surface with a plurality of object waves at the same time and produce the reference wave by way of a Fizeau beam splitter plate or a Fizeau objective, and by virtue of the interferometer including an interferometer stop that is arranged in the beam path upstream of the detector, and imaging optics, wherein the interferometer stop is
(Continued)

situated within, or slightly outside of, the Fourier plane of the imaging optics and said interferometer stop filters the object waves reflected by the surface.

18 Claims, 4 Drawing Sheets

(52) U.S. Cl.
CPC ....... *G01B 9/02057* (2013.01); *G01M 11/005* (2013.01); *G01M 11/0207* (2013.01); *G01B 9/02039* (2013.01); *G01B 2290/50* (2013.01)

(56) References Cited

U.S. PATENT DOCUMENTS

| | | | |
|---|---|---|---|
| 2007/0019203 | A1 | 1/2007 | Jansen |
| 2010/0134801 | A1 | 6/2010 | Millerd et al. |
| 2012/0307258 | A1* | 12/2012 | Koerner ............... G01B 9/0209 356/497 |
| 2013/0057935 | A1* | 3/2013 | Joo ....................... G03H 1/0866 359/10 |
| 2015/0077760 | A1* | 3/2015 | Koerner ............. G01B 9/02008 356/496 |
| 2017/0074648 | A1* | 3/2017 | Baer .................. G01B 9/02072 |

FOREIGN PATENT DOCUMENTS

| | | |
|---|---|---|
| CN | 103759668 A | 4/2014 |
| CN | 104685317 A | 6/2015 |
| DE | 10325601 B3 | 1/2005 |
| DE | 102006057606 A1 | 5/2008 |
| DE | 102006057606 B4 | 12/2008 |
| DE | 202015102459 U1 | 6/2015 |
| WO | 2004051183 A1 | 6/2004 |

OTHER PUBLICATIONS

Measurement of Aspheres and Free-Form Surfaces With the Tilted-Wave-Interferometer, XP055254373. Goran Baer, et al. pp. 1-9.
Interferometer for precise and flexible asphere testing. Eugenio Garbusi, Christof Pruss, and Wolfgang Osten. Optics Letters; Dec. 15, 2008/vol. 33, No. 24, p. 2973-2975.
Non-Translated Chinese Office Action, dated Sep. 4, 2019. pp. 1-6.

* cited by examiner

INTERFEROMETER USING TILTED OBJECT WAVES AND COMPRISING A FIZEAU INTERFEROMETER OBJECTIVE

CROSS-REFERENCE TO RELATED APPLICATIONS

This application is the U.S. National Stage application under 35 U.S.C. 371 of PCT Application No. PCT/EP2016/077610, filed Nov. 14, 2016, which relates and claims priority to German Application No. DE 102015222366.3, filed Nov. 12, 2015, the entire disclosure of each of which is incorporated herein by reference.

BACKGROUND OF THE INVENTION

The present invention relates to an interferometer for areally measuring an optically smooth surface and to a method for areally measuring an optically smooth surface. An interferometer of this kind is also known as a Tilted Wave Interferometer (TWI). The technical basis for the present invention is a method invented at the Institute of Applied Optics (Institut für Technische Optik-ITO) at Stuttgart University for measuring the surface of aspherical and freeform surfaces. It uses a set of mutually tilted wave fronts in order to locally compensate for the specimen's deviation from the sphere of best fit. The set generally consists of a plurality of (e.g. 49) wave fronts that are tilted relative to one another, and fundamentally differs from other interferometers which use just two tilted wave fronts in order to produce two wave fronts that are polarized orthogonally to one another for example. An embodiment, by way of example, is described in DE 10 2006 057 606 B4. The Tilted Wave Interferometer presented therein comprises a point light source array (PLSA) and an optical system that consists of a collimator, an optional interferometer objective, a beam splitter, an interferometer stop, imaging optics and a camera and that is arranged downstream of the PLSA within the optical path of light emanating from the PLSA, the interferometer stop being arranged approximately within the object-side focal plane of the imaging optics, which plane is also known as the Fourier plane.

Further TWIs are known from the publication W. Osten et al., Testing aspheric lenses: New approaches, Optoelectronics, Instruments and Data Processing, Vol. 46, No. 4, 1 Aug. 2010, pages 329-339, XP055337077, US ISSN: 8756-6990, DOI: 10.3103/S8756699010040059, from CN 103 759 668 A and from CN 102 607 454 A.

Known embodiments of the TWI produce their interferograms by superimposing the object wave fronts reflected by the specimen onto a reference wave that is coherent with all the object wave fronts generated by beam splitting from the light from a light source before the tilted object wave fronts are produced. In the embodiment known from DE 10 2006 057 606 B4, this reference wave is guided separately and coupled back in by the beam splitter only after the object wave fronts reflected by the specimen have passed the collimator, such that evaluable interference fringes form on the camera, from which fringes the form deviation of the specimen can be deduced using the method described in DE 10 2006 057 606 B4.

The separate coupling of the reference wave front results in significant differences in the optical paths of the reference wave and the object waves. This results, for example due to thermally induced changes in the structure or local fluctuations in the refractive index of the air, in a disadvantageous instability of the phase differences between the reference wave and the object waves.

The Fizeau interferometers, which have been known since the 19$^{th}$ century and are very widely used due to the stability thereof, produce the reference wave by means of beam-splitting Fizeau surface, the surface normals of which are approximately perpendicular to those of the incident wave front. Since this partially reflective Fizeau surface is usually the last surface before the specimen, for example in a Fizeau objective (transmission sphere), and the beams in the test configuration usually used, known as the "null test", usually strike the specimen perpendicularly and are thus reflected back into themselves, reference and object wave fronts are separated only over a short distance between the Fizeau surface and the specimen and otherwise pass through the interferometer along virtually identical paths. The Fizeau interferometer is therefore also known as a "common path" interferometer. Since only the difference between the reference wave front and the object wave front is imaged in the interferogram, the property of the common paths has a positive effect on the reproducibility of the measurement results.

In the Tilted Wave Interferometer known from DE 10 2006 057 606 B4, a phase shifting method was used to evaluate the interferograms, the reference wave being shifted by a piezo actuator, in a plurality of steps, and an image stack being sequentially captured. Due to the sequential operating mode, the phase shifting leads to a long measuring time. Moreover, methods of this kind are susceptible to oscillations, which makes it more difficult to use the interferometer in manufacturing for example.

Further TWIs are known from the publication W. Osten et al., Testing aspheric lenses: New approaches, Optoelectronics, Instruments and Data Processing, Vol. 46, No. 4, 1 Aug. 2010, pages 329-339, XP055337077, US ISSN: 8756-6990, DOI: 10.3103/S8756699010040059, from CN 103 759 668 A and from CN 102 607 454 A. The device aspects of the present invention differ from the prior art according to CN 102 607 454 A by the characterizing features of claim 1, and the method aspects thereof differ by the characterizing features of the independent method claim.

Producing a sample-specific reference wave for each sample prevents waves that emanate from a plurality of Fizeau reflexes from being superimposed, in a disturbing manner, on the detector. In contrast, in the case of a TWI according to CN 102 607 454 A that uses a Fizeau objective in conjunction with a reference wave that is always the same for each measured value recording, there is likely to be disturbing, disadvantageous superimposition with waves emanating from a plurality of Fizeau reflexes.

The fact that the interferometer is designed to illuminate the optically smooth surface, during the measurement thereof, with different samples of mutually differing object waves, each sample producing its own reference wave that is deactivated when illumination with a different sample occurs, prevents this problem of the disturbing reflexes. Furthermore, the following advantages result in comparison with DE 10 2006 057 606 B4: it is not necessary to use an interferometer objective that has been manufactured individually for this interferometer. The Fizeau objectives that can be used in the invention are widely commercially available and accordingly cheaper than such custom-built models.

Using a Fizeau objective as the interferometer objective makes it possible to use a reflection of the object wave, appearing at the partially reflective surface of the Fizeau objective, as the reference wave front source. When the reference wave is produced in this way, with the exception of the path from the Fizeau surface to the specimen, the optical paths for the object waves and reference waves that extend within the interferometer according to the invention differ only slightly (common path design). This results in advantages in terms of the calibration stability and in terms of the sensitivity of the interferometer to fluctuations in the refractive index of the air, or other influences such as thermal deformation of the structure, or oscillations. The stability of the phase difference between the object wave and the reference wave, which stability is improved by the common path design, opens up new possibilities for evaluating the interferograms.

The design of the interferometer is more compact overall, and consists of fewer optical components than the interferometer from DE 10 2006 057 606 B4.

Phase shifting methods for evaluating the phase are still possible in the case of the interferometer, but, as an alternative option, it is also possible to use carrier frequency methods for determining the phase, and this is advantageous in particular situations.

In the known Tilted Wave Interferometer method, the specimen is illuminated by different samples $A_1 \ldots A_N$ of object waves, and an interferogram is recorded in each case. A typical size for the number N of samples used in a Tilted Wave Interferometer is 4. The measurement data recording using said 4 samples of object wave fronts prevents the object wave fronts that impinge on the detector from overlapping and it thus no longer being possible to evaluate the interferograms. Since the reference wave is supplied separately, said wave illuminates the detector in the case of all recordings using the samples of object waves, and thus results in the desired interferograms.

Replacing the specific interferometer objective used in the Tilted Wave Interferometer known from DE 10 2006 057 606 B4 with a Fizeau lens would initially cause the Fizeau surface to produce reflexes which, during normal operation of the Tilted Wave Interferometer, cannot be used as the reference wave but would instead cause interference. However, sample $A_1$, for example, would contain an object wave front that would produce a reflex on the Fizeau surface that would be used as the reference wave front. For example, in a known embodiment, this would be an object wave front that is produced on the optical axis by means of a point light source and is propagated, untilted, in parallel with the optical axis. However, as soon as a different sample $A_2 \ldots A_N$ is introduced, said wave front is inherently deactivated and therefore cannot produce a reference wave front.

SUMMARY OF THE INVENTION

The solution to this problem according to the invention is for each sample to produce its own reference wave. The samples of object wave fronts, and the position and size of the interferometer stop are selected such that exactly one object wave front per sample produces a reference wave front on the Fizeau surface, which wave front passes through the interferometer stop and reaches the detector, preferably a camera. The reflexes produced on the Fizeau surface by the other object wave fronts of the sample are blocked by the interferometer stop.

It is known that the spherical waves emanating from the different points P1 and P2 within the Fourier plane of the imaging optics each form, on the detector, planar waves having different propagation directions. If two planar wave fronts interfere on the detector in such a way that the interference fringe pattern thereof has an interfringe distance of two pixel lengths, the detection of the interferogram meets the Nyquist criterion known from signal processing. The distance between the associated spherical wave centers P1-P2 within the Fourier plane is then denoted by a. The size a is dependent on the imaging optics and the pixel size of the interferometer used.

A preferred embodiment is characterized in that the rigid arrangement of the point light sources to form a regular grid, and for no point light source to be located at the point where the optical axis of the interferometer intersects with said regular grid, and in that n=three or more point light sources are arranged symmetrically and so as to be equally spaced around the intersection point, the object waves of which point light sources produce the reference waves on the Fizeau objective or the Fizeau plate.

It is furthermore preferable for the interferometer stop to be immovable during the measurement and to be designed so as to allow the reference wave fronts, produced by a plurality of object wave fronts, to reach the detector at the same time, and for the interferometer to comprise a suitable device, preferably a movable stop array, that specifies the samples of the object wave fronts such that, for each measured value recording, just one object wave front produces a reference wave front that reaches the detector.

In order to select the precisely one reference wave front, it is also preferable for there to be a stop array provided on the detector for selecting the object wave front that produces said reference wave front.

It is also preferable for the interferometer stop to be movable and to be able to be positioned such that, for each measured value recording, the light from precisely one reference wave front reaches the detector.

A further preferred embodiment is characterized in that the interferometer stop is dimensioned so as to guide to the detector only object waves that have an angle of incidence that is so similar to the angle of incidence of the reference wave that portions having evaluable fringes in the interferograms are generated on the detector.

It is furthermore preferable for the interferometer to be designed such that portions of the interferogram that have evaluable fringes and result from different object waves overlap on the detector.

A further preferred embodiment is characterized by a light point source array and an optical system that consists of a collimator, and an interferometer objective as an illumination means and that is arranged downstream of the point light source array within the optical path of light emanating from the point light source array, and by a beam splitter, an interferometer stop, and imaging optics as a superimposition means, and by a camera (K), the interferometer stop being arranged within the Fourier plane of the imaging optics, between the imaging optics and the beam splitter, and the light sources within the light source array being arranged in rows and columns and so as to be equally mutually spaced, and a central axis of the interferometer forming a normal of an n-gon, on each corner of which one of n mutually adjacent point light sources is located, and the normal being located on a midpoint of the n-gon.

It is also preferable for the interferometer stop to have an n-gonal or circular aperture.

It is furthermore preferable for the edge length of the n-gonal aperture to be at least equal to an edge length a, where the fringe density of the interferogram, which density occurs when a wave front of which the gradient is limited by the interferometer stop interferes with a planar reference wave, reaches at most half the Nyquist frequency of the camera.

A further preferred embodiment is characterized in that the edge length a is greater again by an additional length of twice ε, ε being less than a/10.

It is also preferable for the interferometer to comprise an additional interferometer arm that produces a central point light source located on an optical axis.

A further preferred embodiment is characterized in that the additional interferometer arm comprises a beam splitter, a mirror, a telescope consisting of a microscope objective and a lens, a lens, and a further beam splitter, the beam splitter being designed and arranged so as to deflect light from a laser of the interferometer, via the additional mirror, and into the telescope, and the telescope being designed to expand the light beam that is incident from the mirror and to direct said beam to the additional lens which is designed and arranged so as to focus the expanded light beam and direct it to the further beam splitter, said beam splitter being arranged in the camera arm of the interferometer, within the beam path of the interferometer, between the interferometer stop and the imaging optics, and being designed to couple light, incident from the additional lens, into the camera arm of the interferometer.

It is also preferable for the interferometer to comprise a Fizeau objective actuator that is designed to shift the Fizeau objective along the optical axis.

It is furthermore preferable for the interferometer to comprise a first shutter and a second shutter that are designed and arranged so as to in each case block or not block, in a controlled manner, a beam path emanating from the beam splitter.

It is also preferable for the first shutter to be arranged between the beam splitter and the microscope objective of the interferometer, and for the second shutter to be arranged between the beam splitter and the additional mirror.

In terms of the method aspects, it is preferable for the measurement to consist of a plurality of measured value recordings, and for different samples of mutually differing object waves to be used for the different measured value recordings, in such a way that, as a result of the different measured value recordings, each point to be measured of the surface is illuminated at least once by an object wave that reaches the detector.

Further advantages can be found in the dependent claims, the description, and the accompanying drawings.

Of course, the features mentioned above and explained below can be used not only in the combination specified in each case, but also in other combinations or in isolate, without departing from the scope of the present invention.

BRIEF DESCRIPTION OF THE DRAWINGS

Embodiments of the invention are shown in the drawings and will be explained in greater detail in the following description. In this case, the same reference signs in different figures in each case denote the same or at least functionally similar elements. In the figures, in each case schematically.

DETAILED DESCRIPTION

Figure 1:
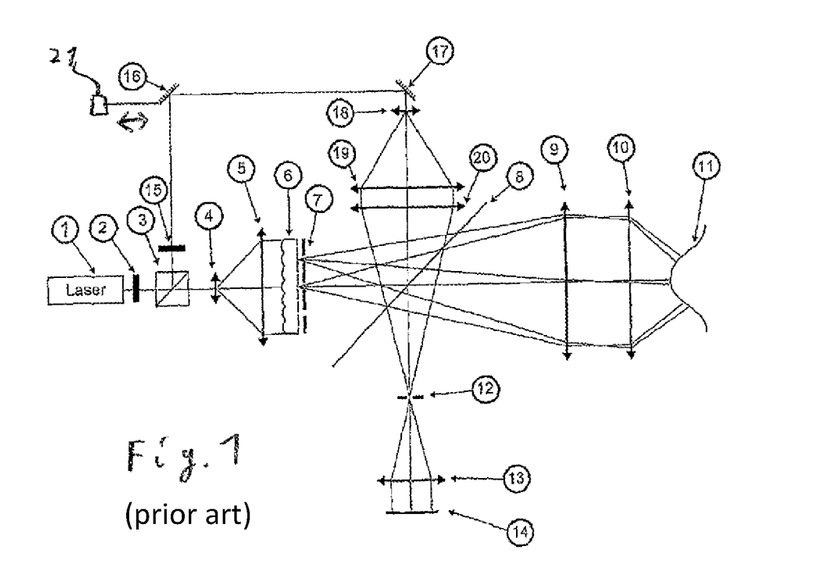
FIG. 1 shows a known Tilted Wave Interferometer.

In detail, FIG. 1 shows a known Tilted Wave Interferometer that essentially corresponds to the interferometer described in DE 10 2006 057 606 B4.

The beam of a coherent linearly polarized laser source 1 passes through a λ/2 plate 2 and is split, by a polarizing beam splitter cube 3, into a test beam and a reference beam. The test beam is expanded by a beam expansion means, for example a Kepler telescope consisting of a microscope objective 4 and a collimating lens 5. The expanded beam illuminates a point light source array 6 which consists of a substrate, to the front face of which substrate facing the microscope objective a microlens array is attached, and to the rear face of which substrate opposite the front face a pin stop array 7 is attached.

The pin stop array 7 can be shifted relative to the point light source array, and in one position in each case non-transparently covers every second point light source in each row and column, said pin stop array being transparent for the remaining point light sources. A point light source array of this kind is described in detail in DE 10 2006 057 606 A1, mentioned at the outset.

Shifting the pin stop array by a grid dimension that corresponds to the spacing of two adjacent point light sources of a row in each case, and that thus also corresponds to the spacing, equal thereto, of two adjacent point light sources of a column in each case, makes it possible to activate all the point light sources in four steps, in each case, following each step, every fourth point light source shining through an associated aperture of the pin stop array and the remaining light sources all being covered. In this case, an activated point light source is understood to be a point light source that is emitting light and is not covered by the pin stop array.

Spherical wave fronts generated by the individual active point light sources pass through the beam splitter 8 and are subsequently collimated by the collimating lens 9. This produces a plurality of wave fronts that are tilted relative to one another by different amounts. Said wave fronts propagate through the interferometer objective 10 which compensates for the spherical basic shape of the specimen. In this case, compensation is understood to mean that the interferometer produces wave fronts that have the same spherical basic shape as the reflective surface 11, to be measured, of the specimen. After being reflected at the specimen, the light propagates back and is reflected, at the beam splitter 8, into the camera arm of the beam path. Here, the light passes through the interferometer stop 12 that is situated within the Fourier plane of the interferometer. Subsequently, the light passes through the imaging optics 13 which images the specimen on the camera 14. The polarization of the light in the reference arm is rotated by 90° by means of a λ/2 plate 15. The light is deflected by two mirrors 16 and 17, one of said mirrors being able to be shifted a few μm by means of a piezo actuator 21 in order to be able to record measurements by means of phase shifting. Subsequently, the beam is expanded by a Kepler telescope consisting of a microscope objective 18 and a collimating lens 19. After that, the lens 20 focuses light of the reference wave onto the center of the stop 12. After passing through the imaging optics 13, the light interferes, on the camera 14, with the light of the object waves reflected at the specimen. The interferometer has a central optical axis 22 that passes through the center of curvature of the optical surfaces of the collimating lens.

Figure 2:
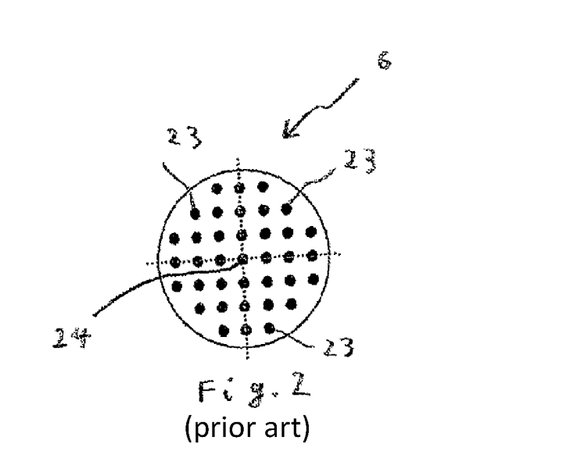
FIG. 2 shows an arrangement of the light-emergence side of a point light source array in the prior art.

FIG. 2 is a view of a point light source array 6 as seen by a viewer who is looking at the point light source array 6 from the location of the collimating lens 9 in FIG. 1 for example.

In this case, the point light source array 6 contains a regular arrangement of rows and columns of point light sources 23. This arrangement in particular comprises a point light source 24 that is located on the central axis mentioned and that is therefore a central point light source 24. In FIG. 2, the central axis is positioned perpendicularly on the drawing plane, at the point of intersection of the two dotted straight lines.

Figure 3:
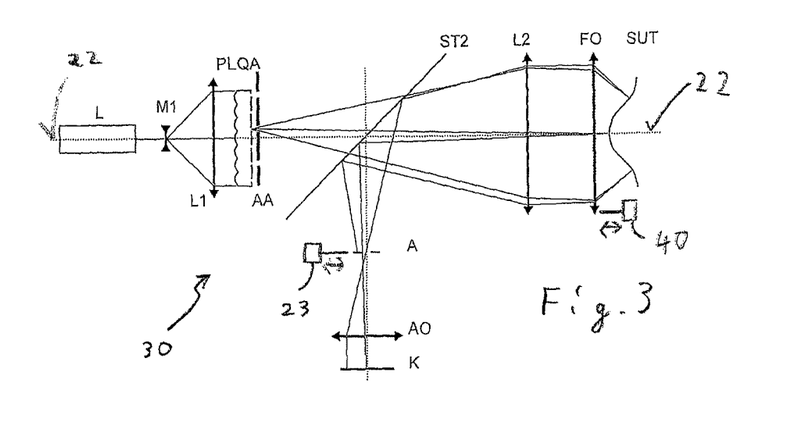
FIG. 3 shows an embodiment of an interferometer according to the invention having an object beam path.

FIG. 3 shows an embodiment of an interferometer 30 according to the invention having an object beam path. The light beam from a coherent laser source L is expanded by a telescope, consisting of a microscope objective M1 and a collimating lens L1, and impinges on a point light source array PLSA which, as in the previous design, consists of a substrate comprising a microlens array on the front face and a pin hole array (pin stop array) on the rear face. The front face is the side facing the incident laser light, and the rear face is the side facing the pin stop. The point light source array PLSA differs from the point light source array 6 from FIG. 2 in particular in that the point light sources thereof are arranged differently with respect to the central axis of the optical system of the interferometer.

Figure 4:
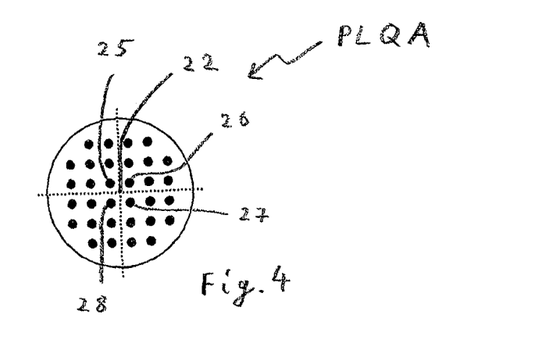
FIG. 4 shows an arrangement of the light-emergence side of a point light source array in the invention.

FIG. 4 is a view of a point light source array PLSA of this kind, in an arrangement compatible with the invention. In this case, FIG. 4 is a view as seen by a viewer who is looking at the point light source array 6 from the location of the collimating lens L2 for example. The essential difference between the point light source array PLSA used here and the point light source array 6 from FIG. 2 is that the point light source array PLSA shown in FIG. 4 does not have any central source, in the arrangement of said array within the interferometer. Depending on the position of the pin stop array AA, one of the four point light sources 25, 26, 27, 28 surrounding the central optical axis 22 is active (including the point light source active in each case, in total every fourth point light source is active in each case). Here, too, the central axis is positioned perpendicularly on the drawing plane of FIG. 4, at the point of intersection of the two dotted straight lines. The point light sources 25, 26, 27 and 28 closest to the optical axis are distinct from the other points that are shown to be the same size and further towards the outside in that said point light sources produce a Fizeau reflex as a reference wave, in addition to the test wave front.

In the following, reference will again be made to the embodiment shown in FIG. 3. In a preferred embodiment, a He-Ne laser of wavelength $\lambda=633$ nm and a power of 10 mW is used as the laser source L. This embodiment is expedient when measuring optics for visible light. Depending on the application, other light sources having different powers and/or different wavelengths may also be expedient, for example a laser having a wavelength of 532 nm and a power of 50 mW.

The light from the point light sources propagates further, through the beam splitter ST2, and is collimated by the collimating lens L2. The Fizeau objective FO converts the mutually tilted, planar wave fronts emanating from the active point light sources into spherical wave fronts, in order to compensate for the spherical basic shape of the specimen. When measuring Schmidt corrector plates or similar specimens that do not have a basic curvature, a planar Fizeau surface is used. After being reflected at the specimen SUT (surface under test), the light propagates back to the beam splitter ST2 and is reflected into the imaging arm/camera arm of the beam path.

Figure 5:
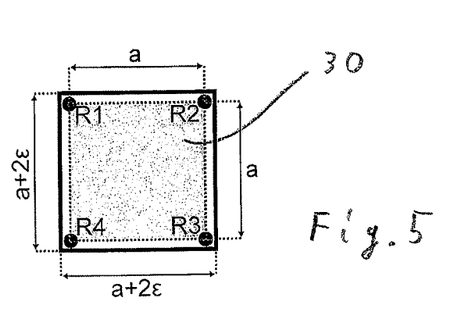
FIG. 5 shows a preferred design of an interferometer stop used in an embodiment of the invention.

The interferometer stop A is situated within the Fourier plane of the structure. FIG. 5 shows a preferred embodiment, in which the interferometer stop has a quadratic aperture 30. The region of the stop outside of the aperture and surrounding the aperture is non-transparent.

If a carrier frequency method is used for evaluating the interferogram, the stop aperture is preferably at least of a size such that the fringe density of the interferogram, which density occurs when a wave front of which the gradient is limited by the stop interferes with a planar reference wave, reaches at most half the Nyquist frequency of the camera.

According to Nyquist, the density of the camera pixels should be at least twice the fringe density produced on the camera by interference, in order for it to be possible to depict the fringes so as to be sufficiently clearly separated. In this case, the fringe density is quasi a signal having the spatial fringe repetition frequency and the pixel density of the spatial sampling frequency. The spatial fringe repetition frequency on the camera depends on the inner diameter of the interferometer stop and the focal length of the collimator.

The stop arranged within the Fourier plane forms a low-pass filter for the spatial frequencies of the light, and thus filters out high spatial frequencies (measured in lines per mm). The edge length a of the quadratic stop aperture thus defines a threshold for spatial frequencies that pass through the stop. The smaller the edge length, the lower the spatial frequency threshold. A specified value of the edge length of the quadratic stop aperture corresponds to the Nyquist frequency of the camera.

If the stop is larger, the fringe pattern produced by the optics is finer than the pixel resolution of the camera, and therefore said pattern cannot be resolved by the camera. If the stop is smaller, the fringe pattern produced by the optics is coarser than the pixel resolution of the camera, the spatial resolution is therefore lost. The edge length preferably corresponds to the Nyquist frequency of the camera K. The points R1 to R4 represent the foci of the last four reference waves emanating from the light sources 25-27 in FIG. 4 and reflected at the Fizeau surface. The quadratic region of the edge length a is the region of the valid beams of the object waves in the mathematical model. The stop that is physically present is preferably larger again by an additional length (twice ε), such that diffraction effects at the edge are prevented. In this case, ε is preferably less than a/10.

However, beams of the object waves that can be used for the evaluation and are valid in this sense are situated only within half the Nyquist frequency (distance a/2 from the center of the stop). After the stop, the light passes through the imaging optics AO and impinges on the camera K.

Figure 6:
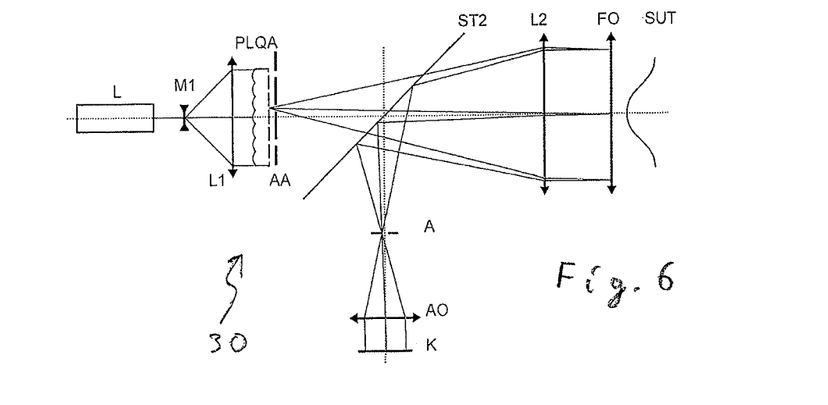
FIG. 6 shows the embodiment from FIG. 3 having a reference beam path.

FIG. 6 shows the interferometer from FIG. 3 having a reference beam path. Unlike in the previous Tilted Wave Interferometer, the reference wave front is produced by means of a Fizeau surface. Said surface is usually the last surface of the objective FO. A Fizeau surface is characterized in that it reflects a portion of the incoming test wave. The reflected portion carries, for example, from 2% to 6% of the energy of the incoming test wave, and is the reference wave for said test wave or for the portion thereof reflected at the specimen as the object wave. Depending on the position of the pin stop array AA, one of the four point light sources surrounding the central optical axis is active.

The light from the active source propagates through the beam splitter ST2 and is subsequently collimated by the lens L2. Subsequently, said light is reflected at the Fizeau surface of the objective FO and is propagates back to the beam splitter ST2 where it is reflected into the camera arm. Said light passes through the stop AO in one of the four corners of the quadratic stop aperture, corresponding to half the Nyquist frequency, and, after passing through the imaging optics AO, interferes with the test wave on the camera K.

The embodiment described, comprising the square, is merely the special case for n=4 of the more general case of an n-gon. Since the position at which the reference wave front intersects with the Fourier plane is always located in one of the four corners of the stop, the beams that are at the maximum distance, within the Fourier plane, from the reference wave are located in the opposite corner. As a result, the fringe density of the interferogram formed from the object wave and the reference wave is limited to the interval between zero (no fringes) and the Nyquist frequency (maximum fringe density). Since the inner diameter of the stop is only half that of the previous Tilted Wave design, when the pixel resolution is the same, the spacing of the sources in the point light source array PLSA must also be halved.

Since the interferometer stop only allows object waves to pass through that are incident in the camera at a similar angle to the reference wave, said stop at the same time blocks out the reflected object waves that would not result in evaluable fringes. Thus, for each object wave emanating from a point light source, at least one evaluable defined region results on the camera. In this case, an evaluable region is to be understood as a fringe pattern comprising resolvable fringes. The region or regions of other object waves are located elsewhere. As a result, each of said regions contains information relating to another portion of the surface of the specimen. Due to the clear definition of the regions, a plurality of object waves is preferably energized at the same time.

As a result of the tilted reference wave, a carrier frequency is always present on the interferogram, and it is therefore possible to use carrier frequency methods in order to determine the phase differences imaged in the interferogram.

Carrier frequency methods are well known to a person skilled in the art involved with designing interferometers and evaluating interferograms, and therefore do not need to be explained in greater detail here. As an example, reference is made to the Direct100 interferometer by the company Zeiss, described in the publication "New Zeiss interferometer". The Takeda method is also known, which method is described in the publication "Fourier-transform method of fringe-pattern analysis for computer-based topography and interferometry", mentioned at the outset, and is a method for calculating the phase from an interferogram that is very efficient in terms of computing.

As an alternative to evaluation by means of carrier frequency methods, it is also still possible, as before, to use a phase shifting method. The advantage in this case is that the portion of the Nyquist frequency required for the carrier frequency, in the first version, is now available for the test wave front, and therefore twice the fringe density is available per interference pattern.

In this case, the stop within the Fourier plane is twice the size of that in carrier frequency methods, and the spacing of the microlenses can also be doubled.

Since, as before, the reference wave is tilted, in this case the stop A also needs to be shifted depending on the position of the pin stop array AA, as shown in FIG. 6.

Figure 7:
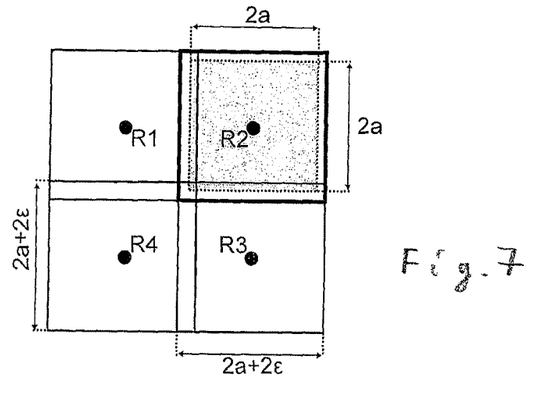
FIG. 7 shows a preferred design of an interferometer stop used in an embodiment.

FIG. 7 is a detail of a quadratic interferometer stop within the Fourier plane, in four different shifting positions.

The quadratic region of the edge length 2a is the region of the valid beams of the object waves in the mathematical model. The stop that is physically present is preferably larger again by an additional length (twice c), such that diffraction effects at the edge are prevented.

Which of the two arrangements is more suitable depends on the measurement task and/or the environmental conditions in question.

In order to ensure that each point of the surface of the specimen is evaluated by at least one object wave, in a preferred embodiment, the interferometer is designed such that the evaluable regions of different object waves from different point light sources overlap.

In order to prevent the interferences in the overlapping regions from causing disturbance, only a sample of object waves is energized at the same time, for example every fourth wave. That is to say that, in the point light source array PLSA, only a quarter of the point light sources available are activated at the same time. In the next measurement process, again every fourth object wave is used, but different object waves, etc. Therefore, after four measurements, all the object waves have been used once, and every point of the surface of the specimen has been sampled, in an evaluable manner, by at least one object wave.

A computer controls the activity of the individual point light sources of the point light source array, stores the interferograms recorded by the camera for each illumination state of the specimen, and thus for each of the switched states (transparent/non-transparent) of point light sources of the point light source array, and determines the dimensions of the surface of the specimen by evaluating the intensity distributions of the stored interferograms.

As has already been mentioned above, a disadvantage of the new arrangement proposed here is that there is no longer a central source. The advantage of a central source is that, when measuring rotationally symmetric aspheres, the symmetry can be used to simplify the alignment process.

Figure 8:
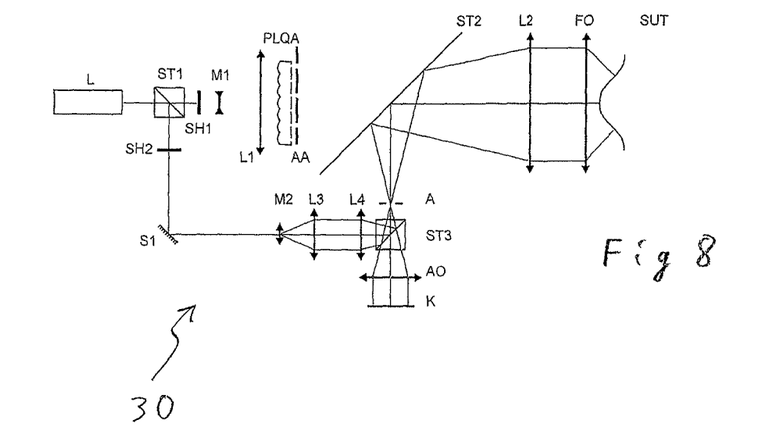
FIG. 8 shows a further embodiment of the invention.

FIG. 8 shows a further embodiment of the invention. This embodiment is characterized by a further interferometer arm, through which a central source is added to an interferometer according to the invention. In addition, the light from the laser is deflected from the additional beam splitter ST1, via the additional mirror S2, and expanded by an additional microscope consisting of a microscope objective M3 and a lens L3. The additional lens L4 re-focuses the light and, using the additional beam splitter ST3, couples said light into the imaging arm. The additional beam splitter ST3 is situated in the camera arm of the interferometer, within the beam path of the interferometer, between the interferometer stop A and the imaging optics AO. From here, the light propagates to the beam splitter ST2 and, from here, follows the same path as a test wave from the point light source array PLSA. The reference wave is likewise generated by a Fizeau reflex. Since the wave is positioned centrally, the reference wave is not tilted, and an interferogram without a carrier frequency results.

In order to evaluate the phase, phase shifting methods can again be used here, by means of the Fizeau objective FO being shifted by an actuator 40. A preferred embodiment is therefore characterized by a Fizeau actuator 40 that is designed to shift the Fizeau objective FO along the optical axis 22. Alternatively, it is also possible to shift the wavelength. In order to be able to switch between the two operating modes (carrier frequency without a central source), two shutters SH1, SH2 are additionally installed in the illumination means, which shutters make it possible to in each case block the beam path that is not required. A preferred embodiment is therefore characterized by a first shutter and a second shutter. The first shutter SH1 is arranged between the additional beam splitter ST1 and the microscope objective M1. The second shutter SH2 is arranged between the additional beam splitter ST1 and the additional mirror S1.

What is claimed is:

1. An interferometer for areally measuring an optically smooth surface, comprising:
   a. means for illuminating a surface region, to be measured, of the surface with a plurality of object waves from different directions, and
   b. means which, on a detector, superimpose object waves reflected at the surface onto a reference wave that is coherent with a plurality of object waves in order to form an interferogram in which dimensions of the surface are imaged,
   c. the interferometer being configured to illuminate the surface with a plurality of object waves at the same time and produce the reference wave by way of a Fizeau beam splitter plate or a Fizeau objective, and thus by means of beam splitting from one of the object waves that illuminate the surface, the interferometer comprising an interferometer stop that is arranged within the beam path upstream of the detector, and imaging optics, the interferometer stop being situated within, or slightly outside of, the Fourier plane of the imaging optics and said interferometer stop filtering the object waves reflected by the surface, characterized in that the interferometer has a rigid arrangement of switchable point light sources as the illumination means, in that the interferometer is designed to illuminate the optically smooth surface, during the measurement thereof, with different samples of mutually differing object waves, each sample producing its own reference wave that is deactivated when illumination with a different sample occurs, and in that these point light sources and the interferometer stop are designed such that, for each measured value recording, just one reference wave front reaches the detector and completely illuminates said detector.

2. The interferometer according to claim 1, characterized in that the rigid arrangement of the point light sources forms a regular grid, and in that no point light source is located at the point (D) where the optical axis of the interferometer intersects with said regular grid, and in that n=three or more point light sources are arranged symmetrically and so as to be equally spaced around the intersection point (D), the object waves of which point light sources produce the reference waves on the Fizeau objective or the Fizeau plate.

3. The interferometer according to claim 1, characterized in that the interferometer stop is immovable during the measurement and is designed so as to allow the reference wave fronts, produced by a plurality of object wave fronts, to reach the detector at the same time, and in that the interferometer comprises a suitable device that specifies the samples of the object wave fronts such that, for each measured value recording, just one object wave front produces a reference wave front that reaches the detector.

4. The interferometer according to claim 3, characterized in that, in order to select the precisely one reference wave front, a stop array is provided on the detector for selecting the object wave front that produces said reference wave front.

5. The interferometer according to claim 1, characterized in that the interferometer stop is movable and can be positioned such that, for each measured value recording, the light from precisely one reference wave front reaches the detector.

6. The interferometer according to claim 1, characterized in that the interferometer stop is dimensioned so as to guide to the detector only object waves that have an angle of incidence that is so similar to the reference wave that portions having evaluable fringes in the interferograms are generated on the detector.

7. The interferometer according to claim 6, characterized in that the interferometer is designed such that portions of the interferogram that have evaluable fringes and result from different object waves overlap on the detector.

8. The interferometer according to claim 1, characterized by a point light source array (PLSA) and an optical system that consists of a collimator, and an interferometer objective (FO) as an illumination means and that is arranged downstream of the point light source array (PLSA) within the optical path of light emanating from the point light source array (PLSA), and by a beam splitter (ST2), an interferometer stop (A), and imaging optics (AO) as a superimposition means, and by a camera (K), the interferometer stop (A) being arranged within the Fourier plane of the imaging optics (AO), between the imaging optics (AO) and the beam splitter, and the light sources within the light source array (PLSA) being arranged in rows and columns and so as to be equally mutually spaced, and a central axis of the interferometer forming a normal of an n-gon, on each corner of which one of n mutually adjacent point light is located, and the normal being located on a midpoint of the n-gon.

9. The interferometer according to claim 8, characterized in that the interferometer stop (A) has an n-gonal or circular aperture.

10. The interferometer according to claim 9, characterized in that the edge length of the n-gonal aperture is at least equal to an edge length a, where the fringe density of the interferogram, which density occurs when a wave front of which the gradient is limited by the interferometer stop (A) interferes with a planar reference wave, reaches at most half the Nyquist frequency of the camera (K).

11. The interferometer according to claim 10, characterized in that the edge length a is greater again by an additional length of twice ε, ε being less than a/10.

12. The interferometer according to claim 1, characterized in that the interferometer comprises an additional interferometer arm that produces a central point light source located on an optical axis.

13. The interferometer according to claim 12, characterized in that the additional interferometer arm comprises a beam splitter (ST1), a mirror (S1), a telescope consisting of a microscope objective (M1) and a lens (L3), a lens (L4), and a further beam splitter (ST3), the beam splitter (ST1) being designed and arranged so as to deflect light from a laser (L) of the interferometer, via the additional mirror (S1), and into the telescope, the telescope being designed to expand the light beam that is incident from the mirror (S1) and to direct said beam to the additional lens (L4) which is designed and arranged so as to focus the expanded light beam and direct it to the further beam splitter (ST3), said beam splitter being arranged in the camera arm of the interferometer, within the beam path of the interferometer, between the interferometer stop (A) and the imaging optics (AO), and being designed to couple light, incident from the additional lens, into the camera arm of the interferometer.

14. The interferometer according to claim 1, characterized in that the interferometer comprises a Fizeau objective actuator that is designed to shift the Fizeau objective along the optical axis.

15. The interferometer according to claim 13, characterized in that the interferometer comprises a first shutter (SH1) and a second shutter (SH2) that are designed and arranged so as to in each case block or not block, in a controlled manner, a beam path emanating from the beam splitter (ST1).

16. The interferometer according to claim 15, characterized in that the first shutter (SH1) is arranged between the beam splitter (ST1) and the microscope objective (M1) of the interferometer, and in that the second shutter (SH2) is arranged between the beam splitter (ST1) and the additional mirror (S1).

17. A method for areally measuring an optically smooth surface, comprising the steps of:
   illuminating a surface region, to be measured, of the surface with a plurality of object waves from different directions, and
   superimposing the object waves reflected at the surface, on a detector, onto a reference wave that is coherent with a plurality of object waves in order to form an interferogram in which dimensions of the surface are imaged,
   illuminating the surface with a plurality of object waves at the same time, and
   producing the reference wave by way of a Fizeau beam splitter plate or a Fizeau objective, and thus by means of beam splitting from one of the object waves that illuminate the surface, and the object waves reflected by the surface being filtered by an interferometer stop that is arranged within the beam path upstream of the detector, and that is situated within, or slightly outside of, the Fourier plane of imaging optics,
   producing the object waves by means of a rigid, grid-like arrangement of switchable point light sources, and
   illuminating the optically smooth surface, during the measurement thereof, with different samples of mutually differing object waves, each sample producing its own reference wave that is deactivated when illumination with a different sample occurs, and,
   recording for each measured value the reference wave that reaches the detector and interferes there with the object waves originating from exactly one point light source and completely illuminating the detector.

18. The method according to claim 17, characterized in that a measurement consists of a plurality of measured value recordings, and in that different samples of mutually differing object waves are used for the different measured value recordings, in such a way that, as a result of the different measured value recordings, each point to be measured of the surface is illuminated at least once by an object wave that reaches the detector.

* * * * *